Aug. 16, 1966 LE ROY D. BARTER 3,267,378
A.C. MEASURING CIRCUIT HAVING AN AMPLIFIER WITH
FEEDBACK PATH IN WHICH A SYNCHRONOUS
SWITCH OUTPUT DRIVES A D.C. METER
Filed March 26, 1962
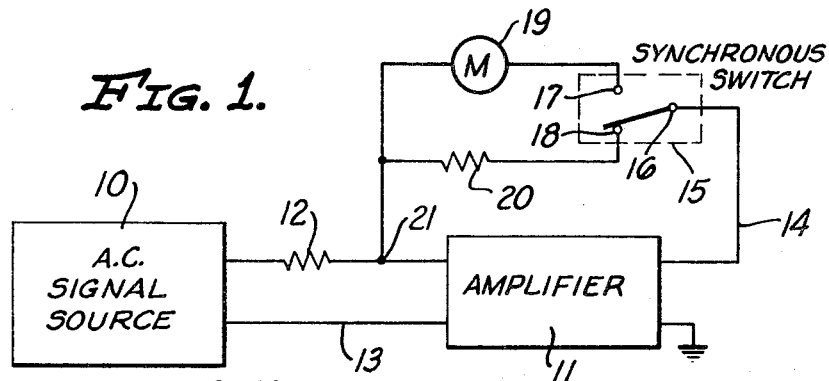
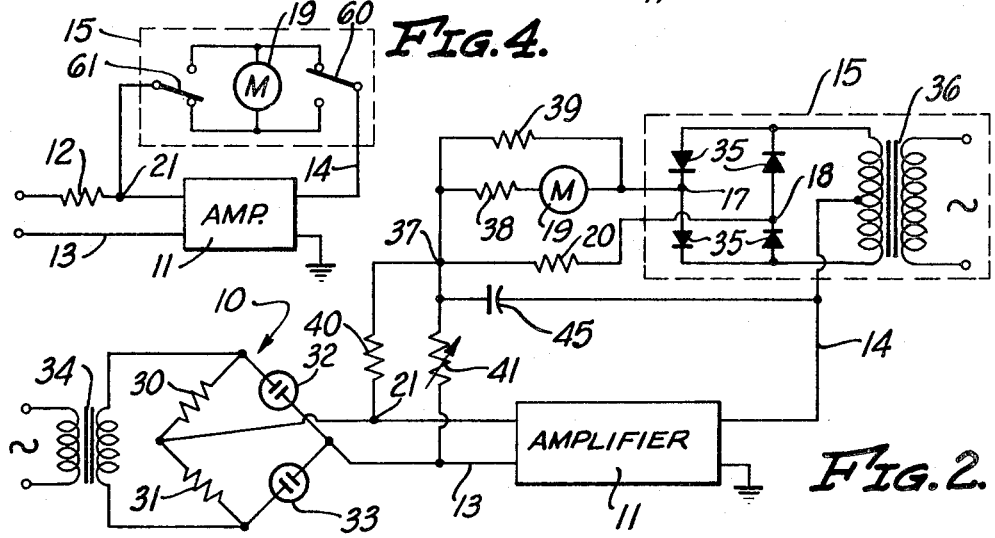
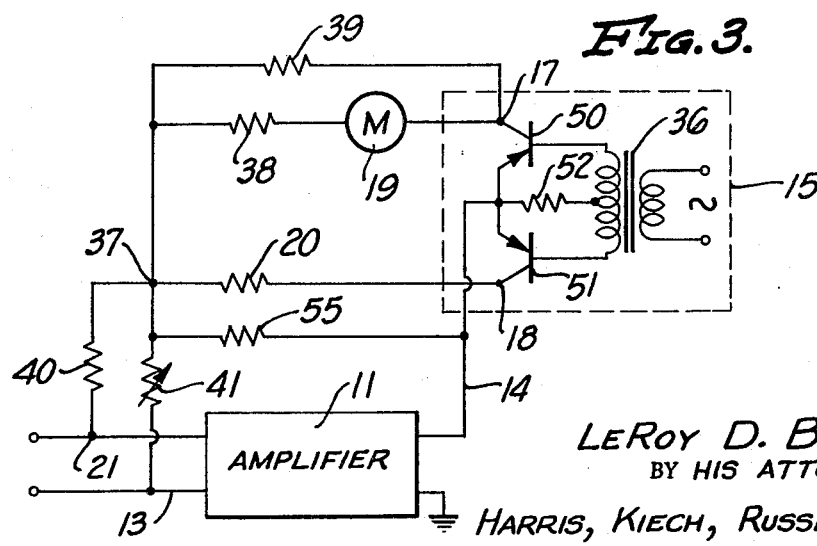
INVENTOR.
LeRoy D. Barter
BY HIS ATTORNEYS
Harris, Kiech, Russell & Kern

United States Patent Office 3,267,378
Patented August 16, 1966

3,267,378
A.C. MEASURING CIRCUIT HAVING AN AMPLIFIER WITH FEEDBACK PATH IN WHICH A SYNCHRONOUS SWITCH OUTPUT DRIVES A D.C. METER
Le Roy D. Barter, Fullerton, Calif., assignor to Beckman Instruments, Inc., a corporation of California
Filed Mar. 26, 1962, Ser. No. 182,416
12 Claims. (Cl. 324—118)

This invention relates to amplifier circuitry for driving a D.C. measuring unit such as a D.C. meter. It is known that D.C. meters have high accuracy and reliability and they are preferred for many electrical measurements. However, many sources do not produce signals of a magnitude adequate to drive a meter directly and amplification is required. This introduces problems of accuracy and stability into the measuring system, particularly when operating with A.C. signal sources.

It is an object of the invention to provide an amplifier circuit for operation with a D.C. meter or other D.C. measuring unit to adequately amplify a signal source and provide a highly stable and accurate measurement of the signal. A further object is to provide an A.C. amplifier circuit for operation with an A.C. signal source to provide a current in the D.C. meter which is proportional to the component of the signal in phase with a reference signal.

It is an object of the invention to provide a feedback amplifier circuit with high negative gain and having a phase sensitive demodulator connected in the feedback loop with an A.C. output providing the feedback signal and with the D.C. meter connected in a D.C. portion of the output to provide an output indication varying as a function of the component of the input signal in phase with the reference voltage of the demodulator. A further object is to provide such a circuit in which the phase sensitive demodulator may be any of the well-known units, such as a synchronously driven switch or relay or a solid state circuit such as a transistor switch or a diode ring, and may be a half wave or a full wave unit. A particular object is to provide such a circuit which may utilize a non-ideal switch without adversely affecting the operation of the circuit.

It is an object of the invention to provide an amplifier circuit for driving a D.C. meter from an A.C. signal source including an operational amplifier having a negative feedback circuit coupling an amplifier output terminal to an amplifier input terminal, means for coupling a current signal to the input terminal, a phase sensitive demodulator coupled in the feedback circuit with the demodulator having an input connected to the amplifier output terminal and first and second outputs providing parallel paths to the amplifier input terminal, and a D.C. measuring unit connected in one or both of the parallel paths to provide an output indication varying as a function of the component of the input signal in phase with the reference voltage of the demodulator. A further object is to provide such an amplifier circuit including impedance means connected in parallel with the demodulator and D.C. measuring unit with the impedance of the means being low relative to the open circuit impedance of the demodulator to maintain the feedback loop closed during the switching transition of the demodulator.

It is an object of the invention to provide such an amplifier circuit in which the demodulator A.C. output is connected to a junction point which in turn is connected to each of the amplifier input terminals through resistors permitting a portion of the demodulator current to bypass the current node of the operational amplifier and thereby increase the current gain between the circuit input and the D.C. meter.

It is an object of the invention to provide such an amplifier circuit which may be used with various signal sources both of voltage and current form.

Other objects, advantages, features and results of the invention will more fully appear in the course of the following description. The drawing merely shows and the description merely describes preferred embodiments of the present invention which are given by way of illustration or example.

In the drawing:
FIG. 1 is a diagram of a simplified version of the circuit of the invention;
FIG. 2 is a diagram of a preferred embodiment of the invention;
FIG. 3 is a diagram of another embodiment of the invention; and
FIG. 4 is a diagram of another embodiment providing full wave operation of the meter.

In the circuit of FIG. 1, a signal source 10 is connected to an amplifier 11 through a resistor 12 and a conductor 13. The amplifier 11 is operated as an operational amplifier with high negative gain and includes a feedback loop from the output line 14 to an input terminal or node 21. A phase sensitive demodulator 15 in the form of a synchronous switch is connected in the feedback path, with input terminal 16 of the demodulator connected to the amplifier output 14. The output terminals 17, 18 of the demodulator are connected in parallel to the current node 21 through a D.C. meter 19 and a resistor 20, respectively.

The operational amplifier functions to provide substantially zero input to the amplifier at the node 21, with the current through the feedback path being made equal to the current from the signal source through the resistor 12. The operational amplifier has very high input impedance and low input current. The desired D.C. signal for measurement by the meter 19 is obtained by operating the phase sensitive demodulator in synchronism with the A.C. signal source. Current alternately flows through the meter 19 and the resistor 20, the latter providing a return path for current from the demodulator 15 during the portion of the A.C. signal cycle when the meter 19 is disconnected by the demodulator from the feedback path. Since the resistor 20 is thereby periodically substituted for the meter 19 in the feedback path, the resistance of resistor 20 is preferably made equal to that of the meter 19, thereby maintaining system stability and uniform operating conditions. The D.C. meter or any equivalent D.C. measuring unit will indicate the average value of the pulsing D.C. current connected thereto by the demodulator and can be calibrated to indicate directly A.C. signal voltage or A.C. signal current as desired. The demodulator is connected directly into the feedback path so that any variation of the demodulator characteristic from that of an ideal impedance does not affect the accuracy of the measurement or the stability of the system.

The circuit of FIG. 2 illustrates a number of variations in the amplifier circuit and components corresponding to those of the circuit of FIG. 1 are identified by the same reference numerals. The signal source 10 comprises a bridge having resistors 30, 31 in two arms and conductivity cells 32, 33 in the other two arms. An A.C. power source is connected across opposing terminals of the bridge through a transformer 34 and the unbalance current between the other two opposing terminals of the bridge is connected as an input to the amplifier 11. The conductivity cell bridge illustrated in FIG. 2 is typical of those used in the measurement of dissolved oxygen in flowing streams.

The phase sensitive demodulator 15 comprises a ring of four diodes 35 and a transformer 36 with the amplifier output 14 connected to the center tap of the transformer secondary. The A.C. reference voltage is connected to the primary of the transformer and the secondary of the transformer is connected to opposing terminals of the diode ring. One parallel output path runs from the terminal 18 of the ring, through the resistor 20 to a junction point 37. The other parallel output path runs from the terminal 17 through a meter compensation circuit to the junction 37. In the meter compensation circuit, the meter 19 is connected in series with a resistor 38 and another resistor 39 is connected in parallel with the meter-resistor series combination. The resistors 38 and 39 provide for calibration and thermal compensation of the meter 19.

In one form of the circuit, the junction point 37 could be connected directly to the current node 21. However, it is preferred to connect the junction point 37 to the current node 21 through a resistor 40 and also connect the point 37 to the other terminal 13 of the amplifier through another resistor 41, which may be variable. With this arrangement, only a portion of the current through the demodulator and meter is connected to the current node 21, while a portion of the current is bypassed to the other input terminal 13. This circuit arrangement provides current amplification for driving the meter while maintaining the high input impedance of the amplifier circuit.

An impedance in the form of a capacitor 45 may be coupled in parallel with the demodulator and meter, as by connecting between the amplifier output 14 and the junction point 37. This impedance provides a continuous A.C. feedback path in the circuit. Such a shunting impedance may be used when the demodulator has an open circuit or high impedance condition while switching from one closed circuit or low impedance condition to the other. Typically this occurs with the solid state demodulators as shown in FIGS. 2 and 3 as well as with break-before-make mechanical switches. A shunting impedance would not be of value where the switch of the demodulator is a make-before-break type or where the response time of the amplifier is less than the duration of the open circuit or high impedance condition in the demodulator.

Another form of the circuit of the invention is shown in FIG. 3, with components corresponding to those of FIG. 2 being identified by the same reference numerals. The phase sensitive demodulator 15 utilizes a pair of transistors 50, 51 with the amplifier output 14 connected to the emitter of each of the transistors and to the center tap of the transformer secondary through a resistor 52. The A.C. reference voltage is connected to the transformer primary and the transformer secondary is connected to the base of each of the transistors. The collectors of the transistors 50, 51 correspond to the output terminals 17, 18, respectively. A shunting resistor 55 is used as the shunting impedance in place of the capacitor 45 of the circuit of FIG. 2. The operation of the circuit of FIG. 3 is the same as that described in conjunction with the circuits of FIGS. 1 and 2.

FIG. 4 illustrates another alternative form of the circuit which provides a full wave demodulated D.C. output for the meter or other D.C. measuring unit. A pair of half wave demodulators, here shown as synchronous switches 60, 61 may be utilized. The amplifier output line 14 is connected to the moving arm or input of the switch 60 and the moving arm of the switch 61 is connected to the amplifier input terminal 21. Each output terminal of the switch 60 is connected to a corresponding terminal of the switch 61 and the D.C. meter 19 is connected across the output terminals of the switch 60. The two switches are driven out of phase to provide the circuit connection shown in FIG. 4 or the circuit connected where each switch is in the reverse position. This circuit arrangement provides a full wave D.C. signal through the meter and provides the full wave A.C. signal to the feedback node 21. It should be noted that the various forms of phase sensitive demodulators and the various circuit modifications discussed above in conjunction with FIGS. 2 and 3 may be incorporated in the circuit of FIG. 4 in the same manner.

The present invention is not limited to the particular forms of phase sensitive demodulators illustrated herein and may be operated with any phase sensitive demodulator including more complex forms of those illustrated. In general, solid state demodulators are preferred as they are more reliable and have longer operating life than mechanical switching demodulators. Also, the upper frequency limit for solid state demodulators is much higher than that of mechanical units, the circuits of FIGS. 2 and 3 being particularly adapted for use with strain gauge signals operating in the ten kilocycle range. Solid state switches are usually referred to as nonideal switches as they do not switch between a zero impedance and an infinite impedance condition but rather between a relatively low impedance condition and a relatively high impedance condition. However, the circuit of the present application is not affected by such departures from ideal characteristics and provides accurate, sensitive and stable indications of the input signal for both ideal and nonideal switching components.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an amplifier circuit for driving a D.C. measuring unit from an A.C. signal source, the combination of:
    an operational amplifier including an input terminal, an output terminal and a negative feedback circuit coupling said amplifier output terminal to said amplifier input terminal, said A.C. signal source being connected to said input terminal;
    phase sensitive demodulator means coupled in said feedback circuit, said demodulator means having an input connected to said amplifier output terminal, and first and second outputs;
    a source of A.C. reference voltage connected to said phase sensitive demodulator means whereby said demodulator means is operated in synchronization with said A.C. signal source;
    a parallel network comprising a first path connected between said first demodulator output and said amplifier input terminal and a second path connected between said second demodulator output and said amplifier input terminal, said demodulator means providing a direct current in said first path; and
    a D.C. measuring unit connected in said first path to provide an output indication varying as a function of the component of said A.C. source signal in phase with said reference voltage of said demodulator means.

2. An amplifier circuit as defined in claim 1 which includes a D.C. measuring unit in said second parallel path and in which said demodulator means provides direct current in both said first and second parallel paths.

3. An amplifier circuit as defined in claim 2 in which said phase sensitive demodulator means includes a single pole double throw switch driven in synchronism with said reference voltage.

4. An amplifier circuit as defined in claim 2 in which said phase sensitive demodulator means includes a four diode ring and a transformer with a center tapped secondary, with the transformer secondary connected across one opposing pair of ring terminals and the tap connected to said amplifier output terminal, and with the transformer primary connected to said reference voltage, with the other opposing pair of ring terminals providing said first and second demodulator outputs.

5. An amplifier circuit as defined in claim 2 in which said phase sensitive demodulator means includes a dual transistor switching circuit driven by a transformer having a center tapped secondary, each of said transistors having a collector electrode, an emitter electrode and a base, with the transformer secondary connected to said bases respectively and the transformer primary connected to said reference voltage, and with said amplifier output terminal connected to a corresponding electrode of each transistor and to the secondary tap, and with the other electrode of each transistor providing said first and second outputs.

6. In an amplifier circuit for driving a D.C. measuring unit from an A.C. signal source, the combination of:
   an operational amplifier including an input terminal, an output terminal and a negative feedback circuit coupling said amplifier output terminal to said amplifier input terminal, said A.C. signal source being connected to said input terminal;
   phase sensitive demodulator means coupled in said feedback circuit, said demodulator means having an input connected to said amplifier output terminal, an A.C. output coupled to said amplifier input terminal, and a D.C. output comprising at least a portion of said A.C. output;
   a source of A.C. reference voltage connected to said phase sensitive demodulator means whereby said demodulator means is operated in synchronization with said A.C. signal source;
   a D.C. measuring unit connected in said D.C. output to provide an output indication varying as a function of the component of said A.C. source signal in phase with said reference voltage of said demodulator means; and
   impedance means connected in parallel with said demodulator means and D.C. measuring unit with the impedance of said impedance means low relative to the open circuit impedance of said demodulator means.

7. An amplifier circuit as defined in claim 6 in which said impedance means is a capacitor.

8. An amplifier circuit as defined in claim 6 in which said impedance means is a resistor.

9. In an amplifier circuit for driving a D.C. measuring unit from an A.C. signal source, the combination of:
   an operation amplifier including first and second input terminals, an output terminal and a negative feedback circuit coupling said amplifier output terminal to said first amplifier input terminal, said A.C. signal source being connected to said amplifier input terminals;
   a junction point;
   phase sensitive demodulator means coupled in said feedback circuit, said demodulator means having an input connected to said amplifier output terminal, an A.C. output coupled to said junction point, and a D.C. output comprising at least a portion of said A.C. output;
   a source of A.C. reference voltage connected to said phase sensitive demodulator means whereby said demodulator means is operated in synchronization with said A.C. signal source;
   a first impedance connected between said junction point and said first amplifier input terminal;
   a second impedance connected between said junction point and said second amplifier input terminal; and
   a D.C. measuring unit connected in said D.C. output to provide an output indication varying as a function of the component of said A.C. source signal in phase with said reference voltage of said demodulator means.

10. In an amplifier circuit for driving a D.C. measuring unit from an A.C. signal source, the combination of:
    an operational amplifier including an input terminal, an output terminal and a negative feedback circuit coupling said amplifier output terminal to said amplifier input terminal, said A.C. signal source being connected to said amplifier input terminal;
    a phase sensitive demodulator coupled in said feedback circuit, said demodulator having an input connected to said amplifier output terminal and first and second outputs;
    a source of A.C. reference voltage connected to said phase sensitive demodulator whereby said demodulator is operated in synchronization with said A.C. signal source;
    a parallel network comprising a first path connected between said first demodulator output and said amplifier input terminal and a second path connected between said second demodulator output and said amplifier input terminal, said demodulator means providing a direct current in said first path;
    a D.C. measuring unit connected in said first parallel path; and
    a resistor of resistance substantially equal to that of said meter connected in said second parallel path, with said meter providing an output indication varying as a function of the component of said A.C. source signal in phase with said reference voltage of said demodulator.

11. In an amplifier circuit for driving a D.C. measuring unit from an A.C. signal source, the combination of:
    an operational amplifier including first and second input terminals, an output terminal and a negative feedback circuit coupling said amplifier output terminal to said first amplifier input terminal, said A.C. signal source being connected to said amplifier input terminals;
    a phase sensitive demodulator coupled in said feedback circuit, said demodulator having an input connected to said amplifier output terminal and first and second outputs;
    a source of A.C. reference voltage connected to said phase sensitive demodulator whereby said demodulator is operated in synchronization with said A.C. signal source;
    a junction point;
    a parallel network comprising a first path connected between said first demodulator output and said junction point and a second parallel path connected between said second demodulator output and said junction point, said demodulator providing a direct current in said first path;
    a first impedance connected between said junction point and said first amplifier input terminal;
    a second impedance connected between said junction point and said second amplifier input terminal;
    a D.C. meter connected in said first parallel path;
    a resistor of resistance substantially equal to that of said meter connected in said second parallel path, with said meter providing an output indication varying as a function of the component of said A.C. source signal in phase with said reference voltage of said demodulator; and
    a third impedance connected between said amplifier output terminal and said junction point with the magnitude of said third impedance low relative to the open circuit impedance of said demodulator.

12. In an amplifier circuit for driving a D.C. meter from an A.C. signal source, the combination of:
    an operational amplifire includign first and second input terminals, an output terminal and a negative feedback circuit coupling said amplifier output terminal to said first amplifier input terminal, said A.C. signal source being connected to said amplifier input terminals;
    a phase sensitive demodulator coupled in said feedback circuit, said demodulator having an input connected to said amplifier output terminal and first and second outputs;

a source of A.C. reference voltage connected to said phase sensitive demodulator whereby said demodulator is operated in synchronization with said A.C. signal source;

a junction point;

a parallel network comprising a first path connected between said first demodulator output and said junction point and a second path connected between said second demodulator output and said junction point, said demodulator providing a direct current in said first path;

a first impedance connected between said junction point and said first amplifier input terminal;

a second impedance connected between said junction point and said second amplifier input terminal;

a measuring circuit connecetd in said first parallel path, said measuring circuit comprising a serially connected D.C. meter and first resistor in shunt with a second resistor;

a third resistor of resistance substantially equal to that of said measuring circuit connected in said second parallel path, with said meter providing an output indication varying as a function of the component of said A.C. source signal in phase with said reference voltage of said demodulator; and a third impedance connected between said amplifier output terminal and said junction point with the magnitude of said third impedance low relative to the open circuit impedance of said demodulator.

References Cited by the Examiner
UNITED STATES PATENTS

| | | | |
|---|---|---|---|
| 2,297,543 | 9/1942 | Eberhardt et al. | |
| 2,900,506 | 8/1959 | Whetter | 329—103 |
| 2,903,523 | 9/1959 | Toomin et al. | 324—118 |
| 3,024,658 | 3/1962 | Huddleston | 324—118 |
| 3,029,386 | 4/1962 | Ricker | 329—112 |

WALTER L. CARLSON, *Primary Examiner.*

FREDERICK M. STRADER, *Examiner.*

D. R. GREENE, J. MULROONEY, *Assistant Examiners.*